(12) United States Patent
Sidelkovskiy et al.

(10) Patent No.: US 9,249,731 B2
(45) Date of Patent: Feb. 2, 2016

(54) NACELLE BIFURCATION FOR GAS TURBINE ENGINE

(75) Inventors: Dmitriy B. Sidelkovskiy, Ellington, CT (US); Robert E. Malecki, Storrs, CT (US); Oleg Petrenko, Danbury, CT (US)

(73) Assignee: United Technologies Corporation, Hartford, CT (US)

( * ) Notice: Subject to any disclaimer, the term of this patent is extended or adjusted under 35 U.S.C. 154(b) by 912 days.

(21) Appl. No.: 13/488,909

(22) Filed: Jun. 5, 2012

(65) Prior Publication Data

US 2013/0319002 A1 Dec. 5, 2013

(51) Int. Cl.
*F02C 7/20* (2006.01)
*F02C 7/32* (2006.01)
*F01D 9/06* (2006.01)
*F02K 3/06* (2006.01)

(52) U.S. Cl.
CPC . *F02C 7/20* (2013.01); *F01D 9/065* (2013.01); *F02C 7/32* (2013.01); *F02K 3/06* (2013.01)

(58) Field of Classification Search
CPC ............... F02C 7/20; F02C 7/32; F02K 3/04; F02K 3/06; F01D 9/06; F01D 9/065; F01D 25/14; F01D 25/16; F01D 25/162; F01D 25/24; F01D 25/243; F01D 25/26; F01D 25/28; F05D 2240/12
See application file for complete search history.

(56) References Cited

U.S. PATENT DOCUMENTS

| | | | |
|---|---|---|---|
| 4,044,973 A | 8/1977 | Moorehead | |
| 4,972,671 A * | 11/1990 | Asselin et al. | 60/39.08 |
| 5,251,435 A | 10/1993 | Pauley | |
| 5,369,954 A | 12/1994 | Stuart | |
| 5,467,941 A | 11/1995 | Chee | |
| 5,483,792 A * | 1/1996 | Czachor et al. | 60/796 |
| 6,004,095 A | 12/1999 | Waitz et al. | |
| 6,820,410 B2 | 11/2004 | Lair | |
| 7,721,549 B2 * | 5/2010 | Baran | 60/770 |
| 7,762,086 B2 * | 7/2010 | Schwark | 60/796 |
| 8,061,649 B2 | 11/2011 | Journade et al. | |
| 8,137,060 B2 | 3/2012 | Winter et al. | |
| 2009/0178416 A1 | 7/2009 | Migliaro et al. | |
| 2009/0252600 A1 | 10/2009 | Winter et al. | |
| 2009/0288387 A1 | 11/2009 | Baltas | |

FOREIGN PATENT DOCUMENTS

| | | |
|---|---|---|
| EP | 1876328 A2 | 1/2008 |
| EP | 2169182 A2 | 3/2010 |

OTHER PUBLICATIONS

International Search Report and Written Opinion for PCT Application No. PCT/US2013/042804 mailed on Jul. 26, 2013.
International Preliminary Report on Patentabilbity for PCT Application No. PCT/US2013/042804, mailed Dec. 18, 2014.

* cited by examiner

*Primary Examiner* — Troy Chambers
*Assistant Examiner* — Joshua Semick
(74) *Attorney, Agent, or Firm* — Carlson, Gaskey & Olds, P.C.

(57) ABSTRACT

A nacelle structure for a gas turbine engine includes a core engine nacelle disposed about an engine axis and an outer nacelle disposed about the core engine nacelle. A bifurcation extends between the outer nacelle and the core engine nacelle along a bifurcation axis extending between the outer nacelle and the core engine nacelle. The bifurcation includes at least one mounting surface that is disposed at a non-normal angle relative to the bifurcation axis.

18 Claims, 5 Drawing Sheets

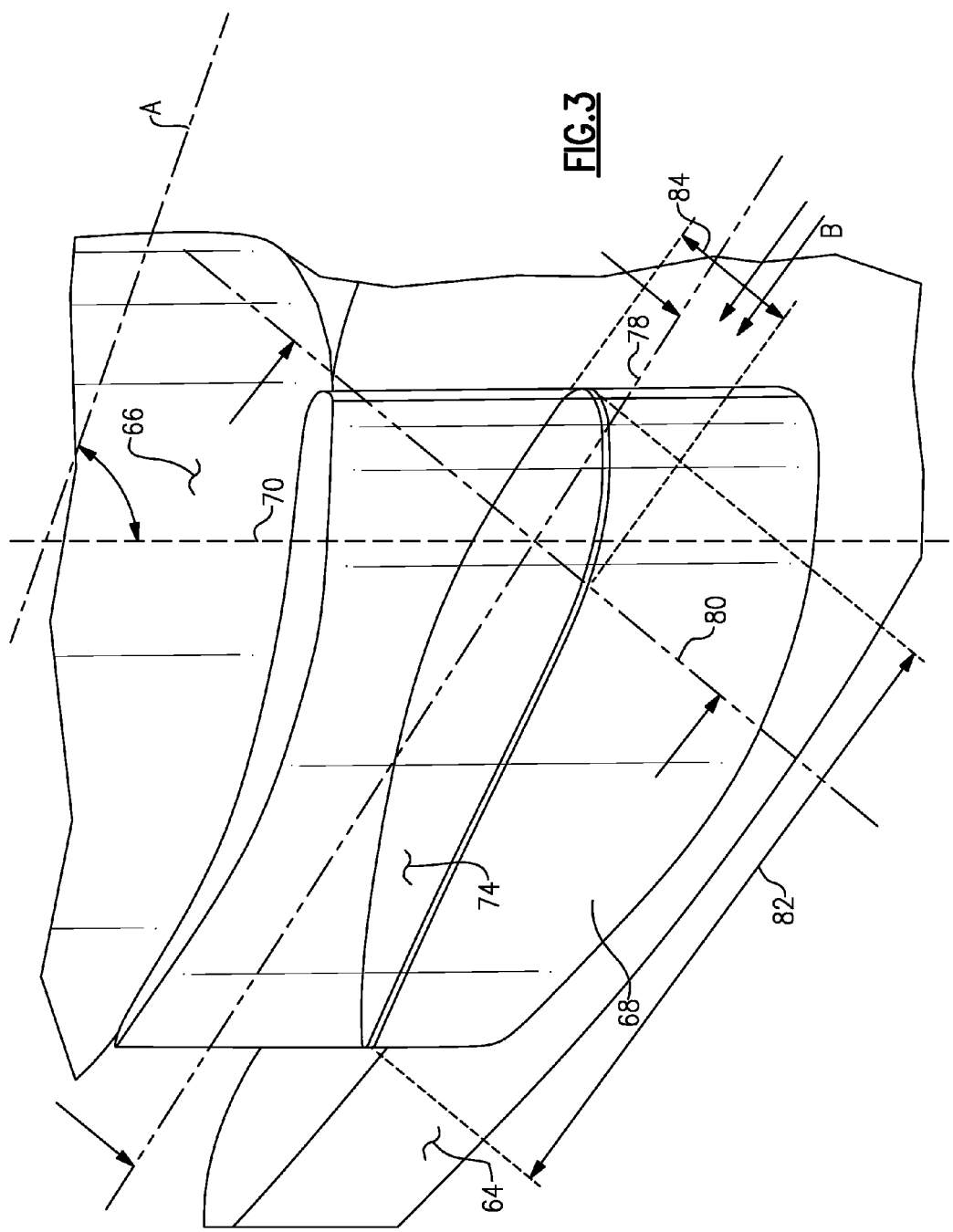

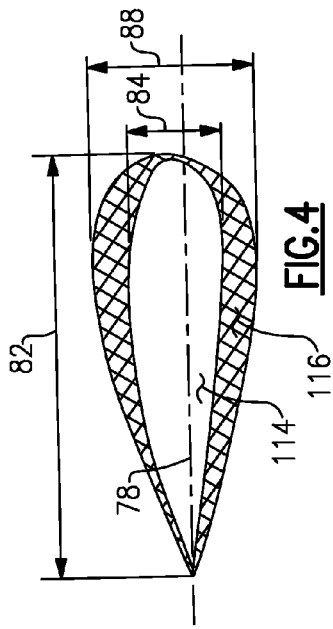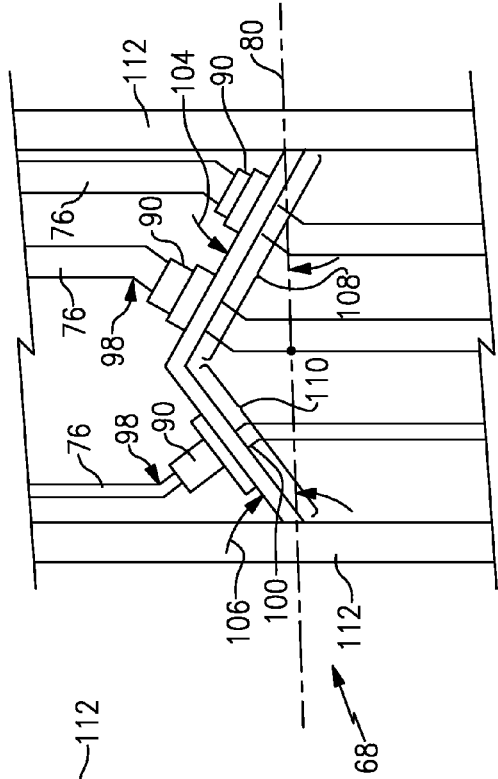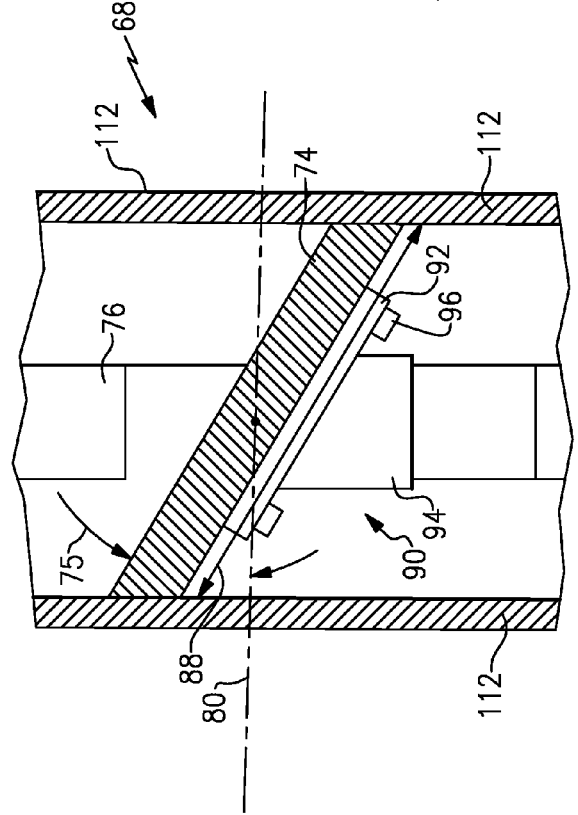

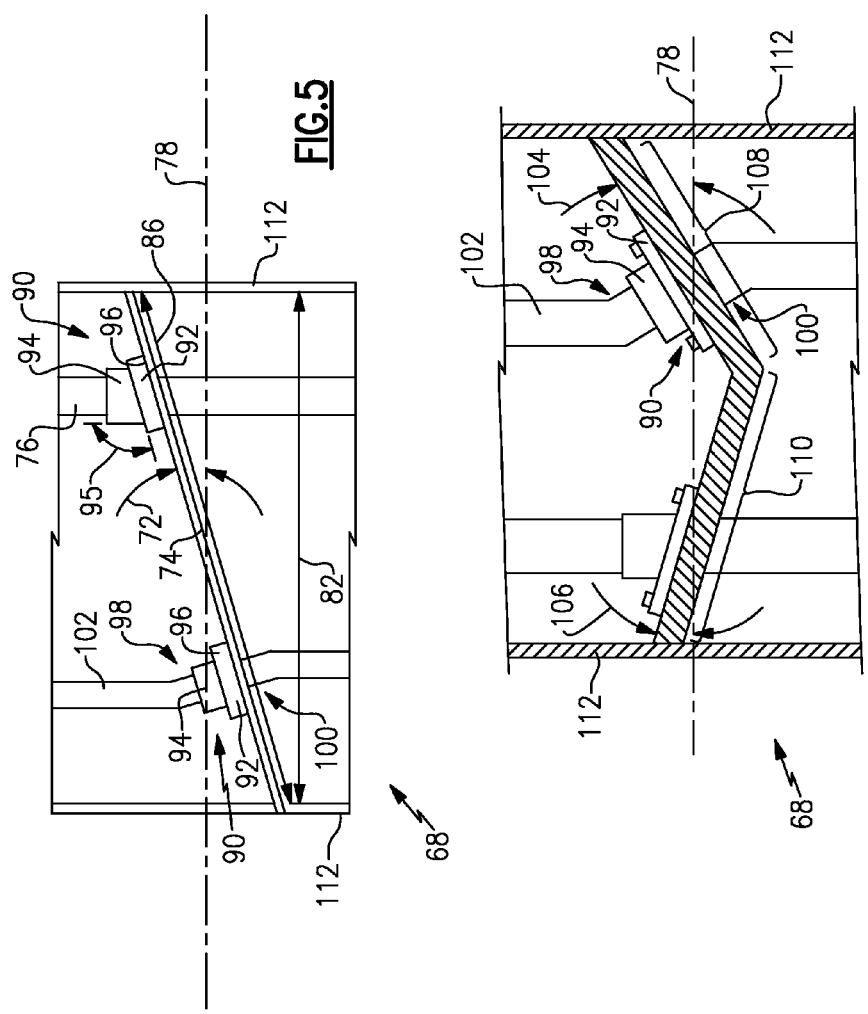

NACELLE BIFURCATION FOR GAS TURBINE ENGINE

BACKGROUND

This disclosure generally relates to a bifurcation between nacelle structures of a gas turbine engine.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The gas turbine engine is surrounded by a nacelle assembly that includes an outer or fan nacelle surrounding the fan section and an inner or core nacelle surrounding the core engine section. A conduit between the outer nacelle structure and the inner nacelle is commonly referred to as a bifurcation. An upper and lower bifurcation is commonly provided along a centerline of the engine.

The bifurcations may include a support structure, but are intended to provide interior space for fuel lines, hydraulic lines, conduits, electrical lines, communication links and other components supporting operation of the gas turbine engine. The bifurcation structure extends through the bypass flow path and therefore it is desirable to minimizing aerodynamic interference by providing a less obstructive shape and size. Therefore, smaller less obstructive nacelle structures are desirable. However, sufficient space for the engine support lines and conduits is required. Accordingly, it is desirable to maximize mounting space available within the interior of a nacelle without increasing aerodynamic interference.

SUMMARY

A nacelle structure for a gas turbine engine according to an exemplary embodiment of this disclosure, among other possible things includes, a core engine nacelle disposed about an engine axis, an outer nacelle disposed about the core engine nacelle, and at least one bifurcation extending between the outer nacelle and the core engine nacelle about a bifurcation axis extending between the core engine nacelle and the outer nacelle, the at least one bifurcation including a mounting surface disposed at a non-normal angle relative to the bifurcation axis.

In a further embodiment of the foregoing nacelle structure, at least one interface conduit extends through the bifurcation to the core engine nacelle and secured to the mounting surface.

In a further embodiment of any of the foregoing nacelle structures, a bracket is secured to the mounting surface for holding the interface conduit.

In a further embodiment of any of the foregoing nacelle structures, the bracket includes a flange for securement to the mounting surface and an extension extending from the flange at a non-normal angle for securing the interface conduit.

In a further embodiment of any of the foregoing nacelle structures, the interface conduit includes a bend portion and a through portion that extends through an opening in the mounting surface and the through portion is disposed normal to the mounting surface.

In a further embodiment of any of the foregoing nacelle structures, the bifurcation includes walls spaced apart from each other defining an interior space with the mounting surface disposed between the walls at the non-normal angle.

In a further embodiment of any of the foregoing nacelle structures, the mounting surface is disposed at an angle relative to an axis parallel with the engine axis.

In a further embodiment of any of the foregoing nacelle structures, the mounting surface is disposed at an angle relative to an axis transverse to the bifurcation axis.

In a further embodiment of any of the foregoing nacelle structures, the mounting surface comprises at least two mounting surfaces each disposed at a different non-normal angle relative to the bifurcation axis.

In a further embodiment of any of the foregoing nacelle structures, the mounting surface comprises at least two mounting surfaces with at least one disposed at the non-normal angle relative to the bifurcation axis.

A gas turbine engine according to an exemplary embodiment of this disclosure, among other possible things includes a fan section including a plurality of fan blades rotatable about an engine axis, a core engine disposed about the engine axis including a compressor section, a combustor in fluid communication with the compressor section, a turbine section in fluid communication with the combustor, a core engine nacelle disposed about the core engine, an outer nacelle disposed about the fan section, and at least one bifurcation extending between the outer nacelle and the core engine nacelle along a bifurcation axis extending between the outer nacelle and the core engine nacelle, the at least one bifurcation including a mounting surface disposed at a non-normal angle relative to the bifurcation axis.

In a further embodiment of the foregoing gas turbine engine, including a geared architecture driven by the turbine section for rotating the fan about the engine axis.

In a further embodiment of any of the foregoing gas turbine engines, including at least one interface conduit extending through the bifurcation to the core engine nacelle and secured to the mounting surface.

In a further embodiment of any of the foregoing gas turbine engines, including a bracket having a flange for securement of the interface conduit to the mounting surface and an extension extending from the flange at a non-normal angle for securing the interface conduit extending.

In a further embodiment of any of the foregoing gas turbine engines, the interface conduit includes a bend portion and a through portion that extends through an opening in the mounting surface and the through portion is disposed normal to the mounting surface.

In a further embodiment of any of the foregoing gas turbine engines, the mounting surface is disposed at an angle relative to an axis parallel with the engine axis.

In a further embodiment of any of the foregoing gas turbine engines, the mounting surface is disposed at an angle relative to an axis transverse to the bifurcation axis.

In a further embodiment of any of the foregoing gas turbine engines, the mounting surface comprises at least two mounting surfaces each disposed at a different non-normal angle relative to the bifurcation axis.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a schematic representation of an example bifurcation.

FIG. 4 is a schematic representation of the areas provided for mounting conduits within the example bifurcation.

FIG. 5 is a cross section of the example bifurcation.

FIG. 6 is cross section of another example bifurcation.

FIG. 7 is a cross section another example bifurcation.

FIG. 8 is cross section of another example bifurcation.

DETAILED DESCRIPTION

Figure 1:
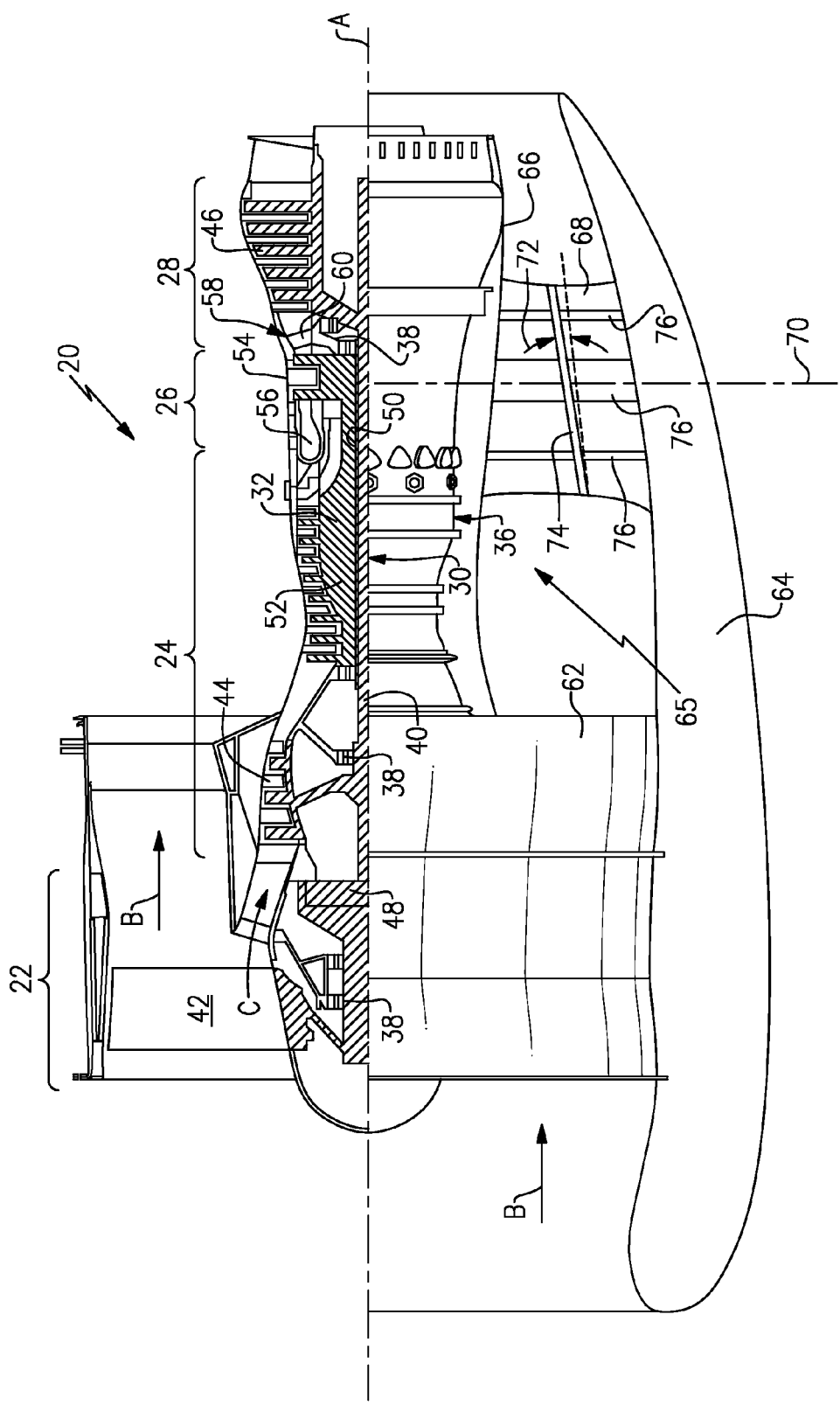
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

The example gas turbine engine includes a fan case 62 that surrounds the fan 42 of the fan section 22. The engine includes the core engine section 65 that is disposed within a core nacelle 66. The bifurcation 68 extends from an outer nacelle structure 64 that surrounds the fan case 62 and fan section 22. The bifurcation extends radially outward between the core nacelle 66 and the outer nacelle 64. In this schematic representation, only a single bifurcation 68 is shown. However, additional bifurcations disposed in a top portion and a bottom portion between the core nacelle 66 and the outer nacelle 64 could be provided to cover support elements for the core engine section 65.

The example bifurcation 68 includes a mounting surface 74 that is disposed at an angle 72 relative to a bifurcation axis 70 that extends between the outer nacelle 64 and the core engine nacelle 66. In this example the bifurcation axis 70 extends substantially perpendicular to the engine axis A, however, a bifurcation axis 70 that is offset relative to a radial plane normal to the engine axis is within the contemplation of this disclosure. Moreover, the bifurcation could extend in other orientations between the core engine nacelle 66 and the outer nacelle 64. Extending through the bifurcation 68 is a plurality of support conduits 76. The support conduits can include electrical lines, hydraulic lines, fuel lines, lubricant carrying lines, or any other conduit that provides and supplies needed fluids, electrical energy, or other support features required for operating the core engine 65.

Figure 2:
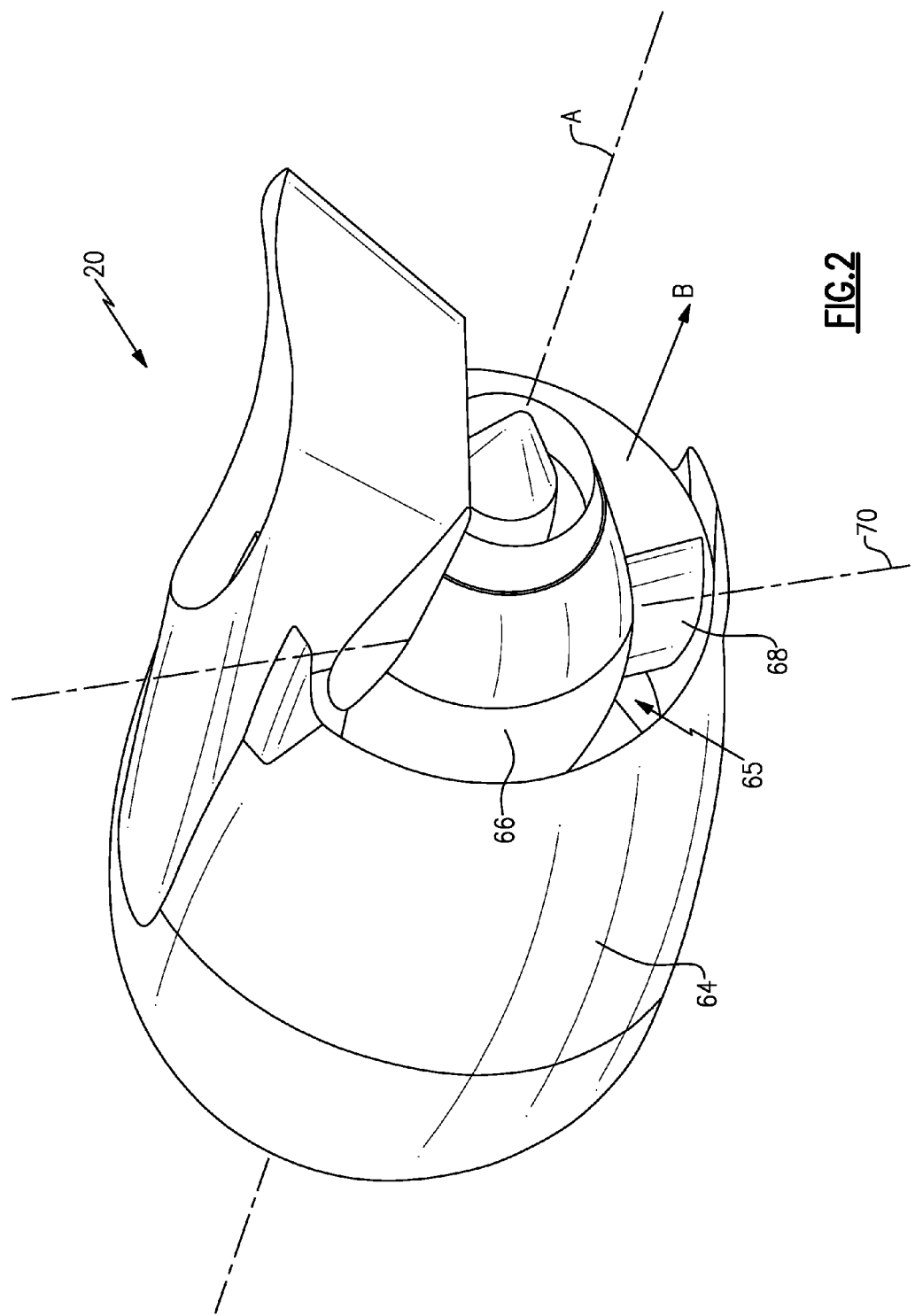
FIG. 2 is a schematic view of an example gas turbine engine including an example bifurcation.

Referring to FIG. 2, the example gas turbine engine 20 is shown in a rear view to illustrate the aft portion of the bypass flow duct. As appreciated, the bifurcation 68 extends through the bypass flow duct and therefore restricts bypass flow to some degree. As appreciated, it is desirable to reduce the effects of the bifurcation 68 on the bypass flow B. However, reducing the size of the bifurcation reduces the amount of room available for routing the various conduits and other support elements required for operation of the core engine 65 (FIG. 1).

Referring to FIG. 3 with continued reference to FIGS. 1 and 2, an example bifurcation 68 extends between the core nacelle 66 and the outer nacelle 64 and is disposed along a longitudinal axis 78 that is substantially parallel to the engine axis A. The bifurcation 68 includes a length 82 along the axis 78 that is substantially parallel to the engine axis A. The example bifurcation 68 also includes a width 84 along an axis 80 that is transverse to the axis 78.

The example bifurcation 68 extends along the bifurcation axis 70 that extends between the outer nacelle 64 and the core nacelle 66. The mounting surface or apron 74 is disposed within the bifurcation 68 between walls that define an aerodynamic shape that is utilized to reduce aerodynamic effects through the bypass duct. The mounting surface 74 defines an area on which conduits and other support interface members are mounted. The interface conduits 76 extend through and are secured to the mounting surface 74. The area available for mounting of the interface conduits 76 is limited by the outer dimensions of the bifurcation 68.

Referring to FIG. 4, the example disclosed bifurcation 68 is schematically shown and includes an increased area indicated by reference number 116 that is provided by tilting the mounting surface 74 relative to the bifurcation axis 70. The reference number 114 includes the surface area available if the mounting surface 74 is disposed normal to radial axis 70. In other words, the area 114 is that area provided if the mounting surface 74 is disposed in a plane that is substantially parallel to the engine axis A and normal to the bifurcation axis 70. The area indicated by reference number 116 illustrates the increase in area obtained by tilting the mounting surface 74 relative to the bifurcation axis 70. The increased area indicated at 116 provides for the mounting of additional conduits through the mounting surface 74.

Referring to FIG. 5, a cross sectional view of a portion of the example bifurcation 68 includes the mounting surface 74 that is disposed at an angle 72 relative to the axis 78, with the axis 78 being substantially parallel to the engine axis A. In this example, the mounting surfaces 74 is tilted in a forward and aft direction relative to walls 112 to provide an increased length indicated at 86. The tilting of the mounting surface 74 increases the amount of area that is available for supporting the various conduits 76.

In this example, a bracket 90 is attached to the mounting surface 74 and includes a flange portion 92 that is attached to the mounting surface 74 by way of fasteners 96. An extension 94 extends outward from the flange 92 to support the interface conduit 76. In this example, the extension 94 is disposed at an angle 95 relative to the bracket 92. The angle 95 between the extension 94 and the flange 92 corresponds with the angle 72 of the example mounting surface 74. The corresponding angles provided by the bracket 90 and the mounting surface 74 allow the conduit 76 to proceed straight through an opening provided in the mounting surface 74. The straight through mounting of the conduit 76 allows the conduit to be fashioned in a current manner without bends or any other alterations due to the angled surface of the mounting surface 74. The example bracket 90 is specifically made and modified to correspond to the angled mounting surface 74.

Referring to FIG. 6, another embodiment of the example bifurcation includes a mounting surface including a first portion 108 and a second portion 110. The first portion 108 is defined at a first angle 104 relative to the axis 78. The second mounting surface 110 is disposed at an angle 106 that is different than the angle 104 of the first mounting portion 108. The different angles allow for an increase in area for mounting the various interface conduits 76. Instead of a single angle, the two separate mounting portions 108 and 110 provide not only the increases surface area for mounting the interface conduits 76, but also different orientations to provide additional mounting options. As appreciated, although two different angles are shown in FIG. 6 to increase the area of the example mounting surface or apron 74, additional surfaces disposed at different angles could be utilized to provide additional mounting area.

FIGS. 5 and 6 further include example conduit 102 that includes a bend portion 98 and a through portion 100 that is disposed perpendicular to the mounting surface 74 through which it extends. The bend portion 98 and through portion 100 provide for the use of brackets 90 that include a flange member 92 and extension member 94 that are transversely orientated to each other. As appreciated, by providing the bend in the conduit 102 to correspond with the angle 106 of the mounting surface 110 the bracket 90 can be a standard bracket for holding the example interface conduit 76.

As appreciated, each of the alternatives could be utilized uniformly within a bifurcation or some conduits may be provided with a bend portion 98 and the through portion 100 while other could be mounted and held to the mounting surface 74 with the bracket 90 that includes an extension 94 that is angled relative to the flange 92 to correspond with the angle of the mounting surface 74.

Referring to FIG. 7, the example mounting surface 74 is angled relative to the axis 80 that is disposed substantially parallel to the engine axis A and transverse to the axis 70 and walls 112. The mounting surface 74 includes a width indicated at 88 that is greater than a width perpendicular to the walls 112. The angle 75 is disposed in a direction transvers to the bifurcation axis 70. The provided angle 75 increases the area within which interface conduits 76 can be routed and mounted on the mounting surface 74.

The brackets 90 (only one shown here) disposed and mounted to the mounting surface take up more room than the conduits 76. The increase in area provided by the angled mounting surface 74 provided within the bifurcation 68 provides increased mounting area for the brackets 90.

Referring to FIG. 8, the bifurcation 68 is illustrated with first and second mounting surfaces 108, 110 that are angled disposed at different angles 104, 106. As appreciated, the mounting surface 108,110 can be angled differently within the bifurcation 68 to provide further mounting area along with providing an increased range of mounting options.

Accordingly, the angled orientation of the example disclosed mounting surface increases the available area within a bifurcation for mounting and securing interface conduits without increasing an exterior space or volume that could potentially disrupt bypass flow through the nacelle structure.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:

1. A nacelle structure for a gas turbine engine comprising:
    a core engine nacelle disposed about an engine axis;
    an outer nacelle disposed about the core engine nacelle; and
    at least one bifurcation extending between the outer nacelle and the core engine nacelle about a bifurcation axis extending between the core engine nacelle and the outer nacelle, the at least one bifurcation including walls defining an inner cavity and including a mounting surface disposed within the inner cavity that extends between the walls and is spaced apart from both the core engine nacelle and the outer nacelle, the mounting surface disposed at a non-normal angle relative to the bifurcation axis.

2. The nacelle structure as recited in claim 1, including at least one interface conduit extending through the bifurcation to the core engine nacelle and secured to the mounting surface.

3. The nacelle structure as recited in claim 2, including a bracket secured to the mounting surface for holding the interface conduit.

4. The nacelle structure as recited in claim 3, wherein the bracket includes a flange for securement to the mounting surface and an extension extending from the flange at a non-normal angle for securing the interface conduit.

5. The nacelle structure as recited in claim 3, wherein the interface conduit includes a bend portion and a through portion that extends through an opening in the mounting surface and the through portion is disposed normal to the mounting surface.

6. The nacelle structure as recited in claim 1, wherein the bifurcation includes walls spaced apart from each other defining an interior space with the mounting surface disposed between the walls at the non-normal angle.

7. The nacelle structure as recited in claim 6, wherein the mounting surface is disposed at an angle relative to an axis parallel with the engine axis.

8. The nacelle structure as recited in claim 6, wherein the mounting surface is disposed at an angle relative to an axis transverse to the bifurcation axis.

9. The nacelle structure as recited in claim 1, wherein the mounting surface comprises at least two mounting surfaces each disposed at a different non-normal angle relative to the bifurcation axis.

10. The nacelle structure as recited in claim 1, wherein the mounting surface comprises at least two mounting surfaces with at least one disposed at the non-normal angle relative to the bifurcation axis.

11. A gas turbine engine comprising:
a fan section including a plurality of fan blades rotatable about an engine axis;
a core engine disposed about the engine axis including a compressor section, a combustor in fluid communication with the compressor section, a turbine section in fluid communication with the combustor;
a core engine nacelle disposed about the core engine;
an outer nacelle disposed about the fan section; and
at least one bifurcation extending between the outer nacelle and the core engine nacelle along a bifurcation axis extending between the outer nacelle and the core engine nacelle , the at least one bifurcation including walls defining an inner cavity and a mounting surface spaced apart from both the core engine nacelle and the outer nacelle and extending across the inner cavity between the walls, the mounting surface disposed at a non-normal angle relative to the bifurcation axis.

12. The gas turbine engine as recited in claim 11, including a geared architecture driven by the turbine section for rotating the fan about the engine axis.

13. The gas turbine engine as recited in claim 11, including at least one interface conduit extending through the bifurcation to the core engine nacelle and secured to the mounting surface.

14. The gas turbine engine as recited in claim 13, including a bracket having a flange for securement of the interface conduit to the mounting surface and an extension extending from the flange at a non-normal angle for securing the interface conduit extending.

15. The gas turbine engine as recited in claim 13, wherein the interface conduit includes a bend portion and a through portion that extends through an opening in the mounting surface and the through portion is disposed normal to the mounting surface.

16. The gas turbine engine as recited in claim 11, wherein the mounting surface is disposed at an angle relative to an axis parallel with the engine axis.

17. The gas turbine engine as recited in claim 11, wherein the mounting surface is disposed at an angle relative to an axis transverse to the bifurcation axis.

18. The nacelle structure as recited in claim 1, wherein the mounting surface comprises at least two mounting surfaces each disposed at a different non-normal angle relative to the bifurcation axis.

* * * * *